United States Patent [19]

Hirata et al.

[11] Patent Number: 4,874,034
[45] Date of Patent: Oct. 17, 1989

[54] REFRACTORY UNIT FOR A HEAT REGENERATOR

[75] Inventors: Kimio Hirata; Yasuo Saito, both of Chiba, Japan

[73] Assignee: Toshiba Monofrax Co., Ltd., Katori, Japan

[21] Appl. No.: 159,939

[22] Filed: Feb. 24, 1988

[30] Foreign Application Priority Data

Mar. 3, 1987 [JP] Japan .................. 62-46680
Jul. 21, 1987 [JP] Japan ................. 62-180015
Jul. 21, 1987 [JP] Japan ................. 62-180016

[51] Int. Cl.[4] ........................... F28D 17/02
[52] U.S. Cl. ..................... 165/9.1; 165/9.4
[58] Field of Search ............ 165/9.1, 9.2, 9.3, 9.4

[56] References Cited

U.S. PATENT DOCUMENTS

| | | | |
|---|---|---|---|
| 2,389,166 | 11/1945 | Seaver | 165/9.1 |
| 2,523,112 | 11/1950 | Mackensen | 165/9.3 |
| 2,833,532 | 5/1958 | Ries | 165/9.1 |
| 4,407,352 | 10/1983 | Gerber | 165/9.1 |

FOREIGN PATENT DOCUMENTS

| | | | |
|---|---|---|---|
| 494577 | 3/1930 | Fed. Rep. of Germany | 165/9.3 |
| 56452 | 5/1978 | Japan. | |
| 149139 | 11/1980 | Japan. | |
| 667448 | 2/1952 | United Kingdom | 165/9.1 |

Primary Examiner—Albert W. Davis, Jr.
Attorney, Agent, or Firm—Ronald P. Kananen

[57] ABSTRACT

In a heat regenerator, a unit body of a refractory unit has an upper end surface (1a), a lower end surface (1b), an outer wall (1c), an inner wall (1d) and a flow passage (7) which is formed by the inner wall (1c) and extends between both end surfaces (1a, 1b). The outer wall (1c) includes a series of concave and convex strips (4). The inner wall (1d) includes a series of concave and convex strips (5).

15 Claims, 7 Drawing Sheets

REFRACTORY UNIT FOR A HEAT REGENERATOR

BACKGROUND OF THE INVENTION

This invention relates to a refractory unit for a heat regenerator adapted to be used in a glass fusion furnace.

In a conventional glass fusion furnace, hot exhaust gas coming through a blow-off hole is introduced into a heat regenerator so as to heat refractory units. A majority of the heat transfer from the hot exhaust gas to the refractory units is of a radiant heat exchange type.

In contrast, the heat transfer from refractory units to cold air is mainly of a convection type. For such a reason, it is important that a refractory unit for a heat regenerator have a large specific surface. Also, turbulent air flow is better than laminar air flow.

A specific surface A (m²/m³) can be expressed as follows:

$$A = S/V$$

where S is a total surface area (m²) of a gas-flow inner wall in a refractory unit and outer surfaces except two end surfaces and four corner surfaces and V is a total volume (m³) of both a gas flow passage and the refractory unit.

Japanese Utility Model Laying-Open No. 53-56452 and Patent Laying-Open No. 55-149139 disclose a cross type or hollow-prism type of refractory units.

Some conventional refractory units are made of an electro-cast refractory material.

Figure 13:
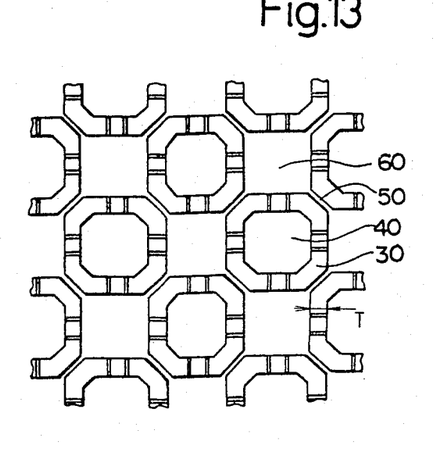
FIG. 13 is a schematic plan view showing a conventional arrangement of refractory units.

FIG. 13 shows a conventional arrangement comprising a plurality of hollow-prism type refractory units 30. Each refractory unit 30 has a uniform thickness T over a full length thereof. The refractory units 30 are vertically stacked in such a manner that a plurality of octagonal flow passages 40 and square flow passages 60 are formed so as to extend in a vertical direction. Hot exhaust gas and cold air can flow through the flow passages 40, 60 one after the other for the heat exchange purpose.

However, such conventional refractory units lack an effective specific surface. For example, in each refractory units 30 of FIG. 13, assuming that the sectional area of the flow passage is 150 mm×150 mm, the wall thickness T is 40 mm and the height is 150 mm, the specific surface is only 24.1 m²/m³. If the sectional area is 150 mm×150 mm, the wall thickness is 40 mm and the height is 140 mm, then the specific surface is the same number of 24.1 m²/m³ as provided by a unit with a height of 150 mm.

As the inner and outer walls of each refractory unit are substantially flat, the gas is apt to flow through the flow passages 40, 60 as a laminar air flow and not a turbulent air flow. Thus, a convection type heat exchange cannot be easily carried out.

Moreover, the ridge or corner portions 50 of the refractory units 30 are flat and arranged in contact with each other. Thus, the refractory units 30 can slip by accident. In particular, if many refractory units 30 are stacked to a great height, they sometimes break loose due to an external force.

SUMMARY OF THE INVENTION

The object of this invention is to provide a refractory unit for a heat regenerator in which convection type gas flow can be improved and a high arrangement having plural refractory units can be maintained in a good shape.

According to this invention, a refractory unit has an increased specific surface. The refractory unit has a gas flow inner wall and a gas flow outer wall both of which are formed by means of plural convex and concave strips. Thus, the increased specific surface is larger than a specific surface of a conventional refractory unit having a flat wall.

As to the outer wall, the convex and concave strips extend in parallel to a direction at a right angle to the center of a gas flow passage.

As to the inner wall, the convex and concave strips can extend in parallel to a direction at a right angle to the center of a gas flow passage. Also, the convex and concave strips can extend along the center of the gas flow passage.

Preferably, the convex and concave sprips include a series of crests and roots which are arranged one after the other in the shape of bellows. As to the outer gas flow wall, the top line of each crest is in parallel to both end surfaces of the refractory unit. In case of the inner gas flow wall, the top line of each crest is in parallel to or at a right angle to both end surfaces of the refractory unit.

When plural refractory units are arranged in place, the convex and concave strips of the refractory unit engage those of another refractory unit at the adjacent corner portions of the refractory units. For example, although all refractory units are substantially the same in shape, they are designed to engage with each other in a fitting condition by alternately turning the plurality of refractory units upside down.

A specific surface of a refractory unit is preferably increased by 40% or more as compared with the prior art so as to obtain excellent turbulent gas flows.

DETAILED DESCRIPTION OF THE EMBODIMENTS

Figure 1:
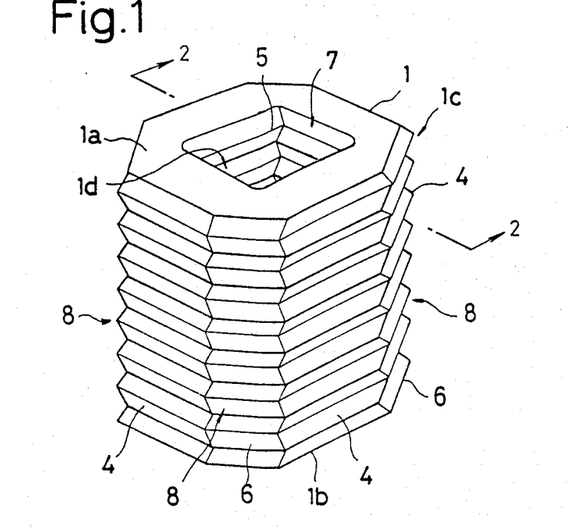
FIG. 1 is a perspective view showing a refractory unit for a heat regenerator according to a first embodiment of this invention.
Figure 2:
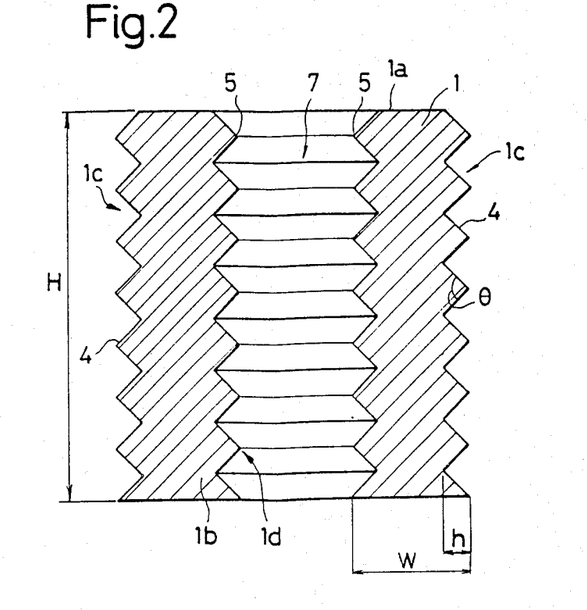
FIG. 2 is a sectional view taken along the line 2—2 in FIG. 1.

FIGS. 1 and 2 show a refractory unit for a heat regenerator according to a first embodiment of this invention. A unit body 1 includes an upper end surface 1a, a lower end surface 1b and a gas flow passage 7 having a square cross-section and extending along its center between the end surfaces. The unit body 1 has an octagonal contour in cross section so as to form four corner portions 8. For example, the size of the flow passage 7 is 150 mm×150 mm, and the thickness W of the unit body 7 is 40 mm.

The refractory unit is made by an electro-casting method.

Except for the end surfaces 1a, 1b, the whole wall of the refractory unit is formed with plural convex and concave strips in a series which extends in parallel to a direction at a right angle to the center of the flow passage 7. That is, an outer wall 1c has a plurality of convex and concave strips 4 while an inner wall 1d has a plurality of convex and concave strips 5. The flow passage 7 is defined by the inner wall 1d. The strips 4 and 5 are formed in the shape of bellows so that a series of crests and roots are arranged one after another. For instance, the height h (FIG. 2) is 10 mm, the top line of each crest is in parallel to both end surfaces 1a, 1b, the apex angle θ of each crest is 90 degrees, and the height H of the refractory unit is 150 mm.

Figure 3:
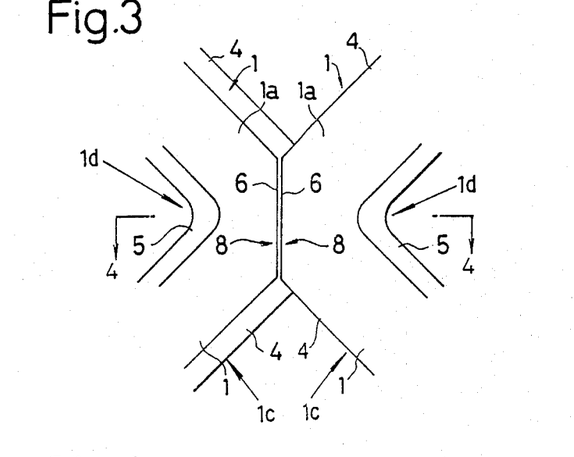
FIG. 3 is a plan view showing how plural refractory units are combined according to the first embodiment of this invention.
Figure 4:
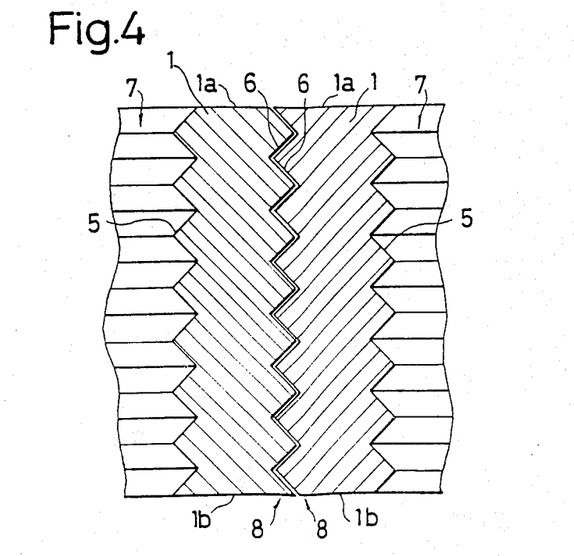
FIG. 4 is a sectional view taken along the line 4—4 in FIG. 3.

FIGS. 3 and 4 show how plural convex and concave strips 6 of a first refractory unit engage corresponding strips 6 of a second refractory unit adjacent to the first refractory unit when they are combined. One of the four corner portions 8 of the first refractory unit engages the corresponding corner portion 8 of the second refractory unit in such a manner that the convex strips are in contact with the concave strips.

Although all of the refractory units are substantially the same, by alternately turning a plurality of refractory units upside down, the refractory units can engage with one another as best shown in FIG. 4. If a set of four refractory units are arranged in a horizontal plane, the gas flow passage 7 is formed in each refractory unit, and a further gas flow passage is defined by the units which corresponds to the gas flow passage 60 of the conventional refractory unit 30 shown in FIG. 13.

The refractory units are horizontally arranged in contact with one another and vertically stacked in such a manner that a plurality of flow passages are formed, extending in a vertical direction. Hot exhaust gas and cold air can flow through the flow passages one after the other for heat exchange purpose.

In each embodiment of FIGS. 1 to 4, the refractory unit has a specific surface of 34/1 m²m³.

(8×0.15×0.15×1.414)/(0.23×0.23−2×0.043×0.04)×0.15=34.1

As compared with this embodiment, a conventional flat wall type refractory unit has a specific surface of 24.1 m²/m³ for a case where it has the wall thickness of 40 mm, a gas flow section of 150×150 mm, and height of 150 mm. Thus, a refractory unit according to this invention can have an increased specific surface by 41%.

Figure 5:
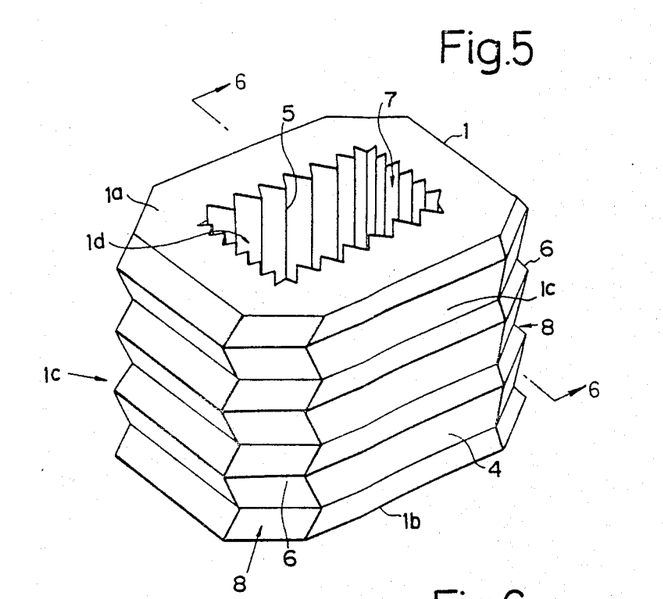
FIG. 5 is a perspective view showing a refractory unit for use in a heat regenerator according to a second embodiment of this invention.
Figure 6:
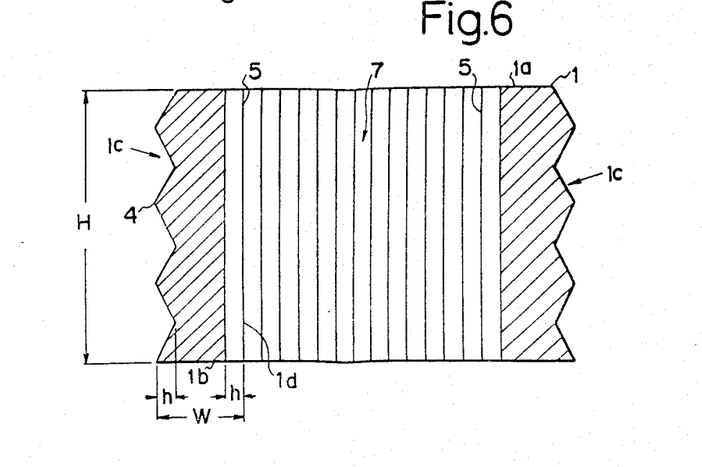
FIG. 6 is a sectional view taken along the line 6—6 in FIG. 5.

FIGS. 5 and 6 show a refractory unit for a heat regenerator according to a second embodiment of this invention. A unit body 1 includes an upper end surface 1a, a lower end surface 1b and a gas flow passage 7 having substantially a square cross-section and extending along its center between the end surfaces. The unit body 1 has an octagonal contour in cross section so as to form four corner portions 8. For example, the size of the flow passage 7 is 150 mm×150 mm, and the thickness W of the unit body 7 is 40 mm.

Except for end surfaces 1a, 1b, the refractory unit has an inner wall 1d and an outer wall 1c. The outer wall 1c has a plurality of convex and concave strips 4 while the inner wall 1d has a plurality of convex and concave strips 5. As to the outer wall, the convex and concave strips extend in parallel to each other and in a direction at a right angle to the center of the flow passage 7. As to the inner wall, the convex and concave strips extend along the center of the flow passage 7.

The flow passage 7 is defined by the inner wall 1d. The strips 4 and 5 are formed in the shape of belows so that a series of crests and roots are arranged one after another.

For instance, the height h (FIG. 6) is 10 mm. As to the outer wall 1c, the top line of each crest is in parallel to both end surfaces 1a, 1b, and the distance between the adjacent roots or crests is 40 mm. As to the inner wall 1d, the top line of each crest is in parallel in a direction at right angle to both end surfaces 1a, 1b, and the distance between the adjacent roots or crests is 20 mm. The height H of the refractory unit is 140 mm. The reference W in FIG. 6 denotes the distance between the top of the crests of the inner wall and the top of the crests of the outer wall.

Figure 7:
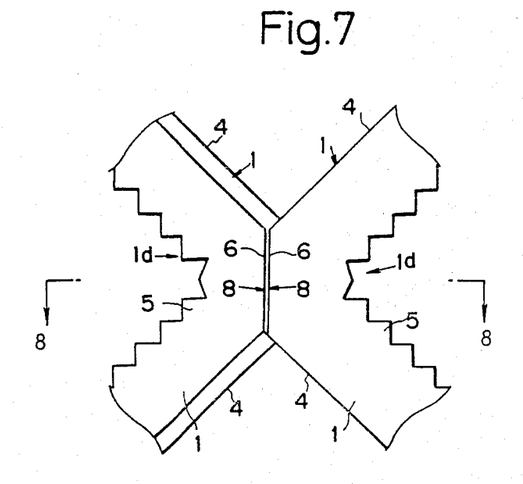
FIG. 7 is a plan view showing how plural refractory units are combined according to the second embodiment of this invention.
Figure 8:
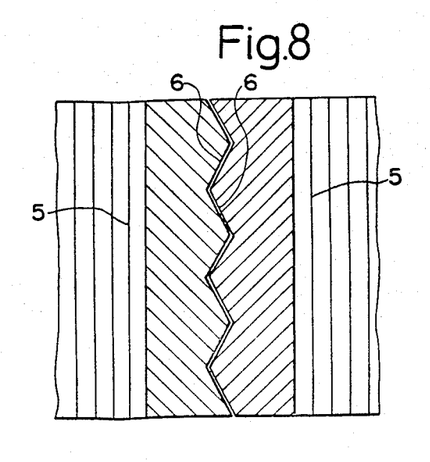
FIG. 8 is a sectional view taken along the line 8—8 in FIG. 7.

FIGS. 7 and 8 show how a plurality of convex and concave strips 6 of a first refractory unit engage corresponding strips 6 of a second refractory unit adjacent to the first refractory unit when they are combined. The description on the arrangement of FIGS. 3 and 4 can also be applied to the embodiment of FIGS. 5 and 6.

If a first refractory unit is set on a second refractory unit in such a manner that the lower end 1b of the first refractory unit is exactly positioned on the upper end 1a of the second refractory unit, then plural flow passages 7 are aligned along a common center line. However, they can be assembled in any other different way. For example, they can be alternately arranged in a vertical direction so that the flow passages 7 defined by the vertical strips 5 and the flow passages defined by the horizontal strips 4 are positioned one after the other.

In the embodiment of FIGS. 5 to 8, the refractory unit has a specific surface of 30.5 m²/m³.

(4×0.15×0.14×2+4×0.15×0.14×1.115)/(0.23×0.23−2×0.04×0.04)×0.14=30.5

A conventional flat wall type refractory unit of a size corresponding to this embodiment has a specific surface of 24.1 m²/m³. Thus, according to this invention, the specific surface increases by 26.5%.

Figure 9:
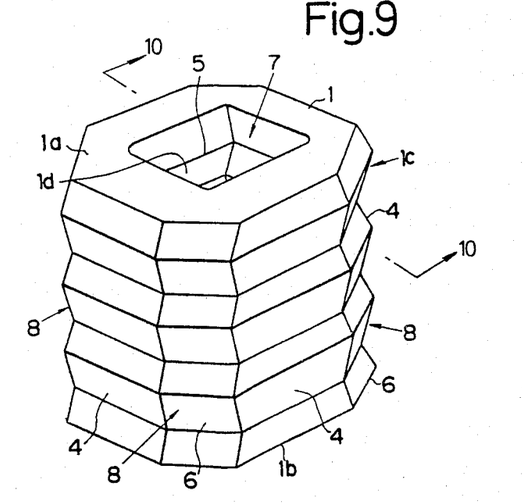
FIG. 9 is a perspective view showing a refractory unit for a heat regenerator according to a third embodiment of this invention.
Figure 10:
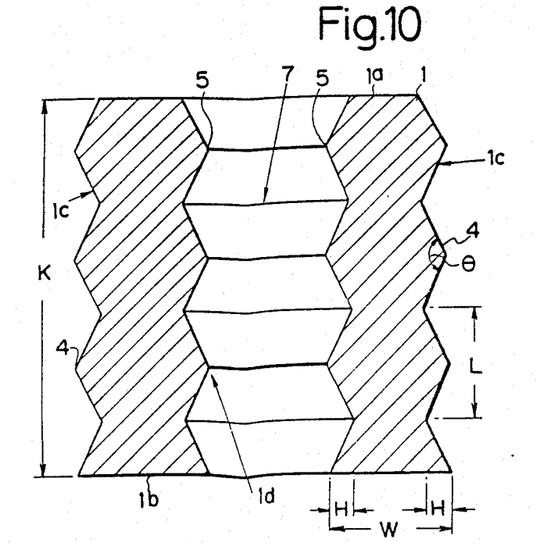
FIG. 10 is a sectional view taken along the line 10—10 in FIG. 9.

FIGS. 9 and 10 show a refractory unit for a heat regenerator according to a third embodiment of this invention. A unit body 1 includes an upper end surface 1a, a lower end surface 1b and a gas flow passage 7 having a square cross-section and extends along its center between the end surfaces. The unit body 1 has an octagonal contour in cross section to form four corner portions 8. For example, the size of the flow passage 7 is 150 mm×150 mm, and the thickness W of the unit body 7 is 40 mm.

Except for the end surface 1a, 1b, the refractory unit has an inner wall 1d and an outer wall 1c. The outer wall 1c has a plurality of convex and concave strips 4 while the inner wall 1d has a plurality of convex and concave strips 5.

The flow passage 7 is defined by the inner wall 1d. The strips 4 and 5 are formed in the shape of bellows so that a series of crests and roots are arranged one after another.

The ratio (H/L) of the height H to the width L of the strips preferably ranges between ⅛ to ½. In the embodiment of FIG. 10, the height H is 10 mm, and the width L is 40 mm. Thus, the ratio (H/L) is ¼.

For example, the apex angle θ of each crest is 127 degrees and the height K of the refractory unit is 140 mm.

The reference W in FIG. 10 denotes the distance between the top of the crests of the inner wall and the top of the crests of the outer wall.

Figure 11:
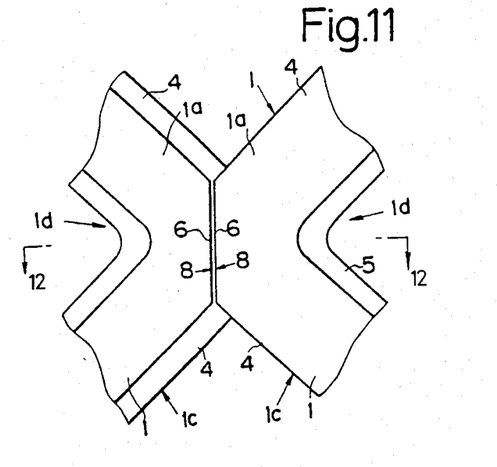
FIG. 11 is a plan view showing how plural refractory units are combined according to the third embodiment of this invention.
Figure 12:
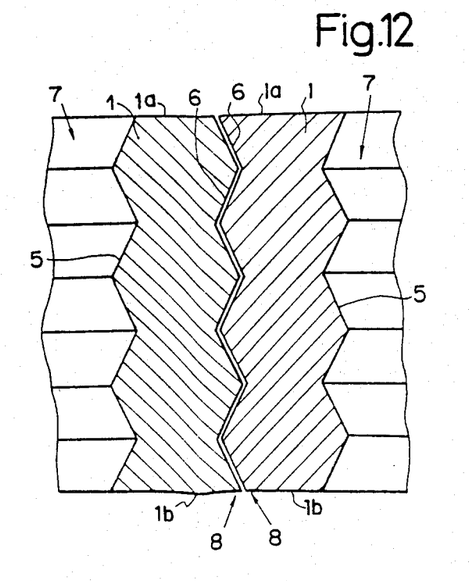
FIG. 12 is a sectional view taken along the line 12—12 in FIG. 11.

FIGS. 11 and 12 show how a plurality of convex and concave strips 6 of a first refractory unit engage corresponding strips 6 of a second refractory unit adjacent to the first refractory unit when they are combined. The description on the arrangement of FIGS. 3 and 4 can be also applied to the arrangement of FIGS. 11 and 12.

In the embodiment of FIGS. 5 to 8, the refractory unit has a specific surface of 27.0 m$^2$/m$^3$.

$$(4\times 0.15\times 0.14\times 1.12)/(0.23\times 0.23-2\times 0.04\times 0.04)\times 0.14=27.0$$

A conventional flat wall type refractory unit of a size corresponding to this embodiment has a specific surface of 11.3 m$^2$/m$^3$. Thus, according to this invention, a specific surface increases by 12%.

In the three embodiments of this invention as above-stated, a refractory unit can be manufactured by a conventional fusion casting method.

For example, a core is formed of refractory sand and adhesive such as phenolic resin so as to have an outer surface corresponding in shape to the inner wall of a refractory unit for defining a flow passage 7. A die body made of the same material is placed so as to enclose the core. A fused refractory material is poured into a space between the die body and the core and then gradually cooled so as to become solid. Thereafter, the die body and the core are broken whereby a refractory unit can be obtained.

In the case of the refractory unit shown in FIGS. 5 and 6, as the strips in the inner wall 1d are arranged in parallel to the center line of the flow passage 7 to make for easy removal of the core. If the inner wall is formed in the shape of a slight taper, removal of the core is very easy.

According to this invention, a refractory unit can produce turbulent flows within a heat regenerator. In particular, such turbulent flows can be produced near a wall surface of a refractory unit at a high temperature. Thus, the hot air which has been heat-exchanged at the wall surface of the refractory unit can be easily introduced into a central portion of a flow passage while the cold air can move effectively toward the wall surface. As a result, a temperature difference between the refractory unit and the air near it is always great.

In addition, the refractory unit has an increased specific surface.

Accordingly, because the turbulent flow effects and the increased specific surface effects are combined in use, a high efficiency of heat transfer can be obtained according to this invention.

Also, if refractory units are assembled in combination in such a manner that a series of concave and convex strips of adjacent refractory units engage with one another at each corner portion thereof, then a good shape can be maintained even if some external force is exerted on them and a high arrangement can be designed. Accordingly, a heat regenerator can have an increased capacity and safety.

We claim:

1. A refractory unit for a heat regenerator comprising a unit body having a first end surface, a second end surface, an outer wall, an inner wall, a flow passage formed by the inner wall and extending between the first and second end surfaces, the flow passage having a center line, the outer wall including a series of concave and convex strips, the inner wall including a series of concave and convex strips, and four corners adapted to engage with corresponding corners of other adjacent refractory units when said units are arranged, thereby to form a further flow passage defined by the outer walls of the refractory units, each of the corners having a series of concave and convex strips;
   wherein all of the refractory units are substantially the same in shape and include means for engaging with one another in a fitting condition by alternately turning the refractory units upside down.

2. A refractory unit as defined in claim 1, wherein the concave and convex strips of the outer wall extend in parallel in a direction at a right angle to the center line of the flow passage.

3. A refractory unit as defined in claim 1, wherein the concave and convex strips of the inner wall extend in parallel in a direction at a right angle to the center line of the flow passage.

4. A refractory unit as defined in claim 1, wherein the concave and convex strips of the inner wall extend in parallel to the center lines of the flow passage.

5. A refractory unit as defined in claim 1, wherein the convex and concave strips of both the outer wall and the inner wall include a series of crests and roots arranged one after the other.

6. A refractory unit as defined in claim 5, wherein the crests and the roots are formed in the shape of bellows.

7. A refractory unit as defined in claim 1, wherein the refractory unit has a specific surface which is increased by 40% or more as compared with a conventional refractory unit having only a flat wall for defining a flow passage.

8. A refractory unit as defined in claim 7, wherein the convex and concave strips of the outer and inner walls include a series of crests and roots which are formed in the shape of bellows, and each top line of the crests is in parallel to the first and second end surfaces.

9. A refractory unit as defined in claim 1, wherein the refractory unit has an octagonal contour in cross section so as to form four corner portions and wherein the concave and convex strips of the outer wall extend in parallel to a direction at a right angle to the center line of the flow passage, and wherein the concave and convex strips of the inner wall extend in parallel to the center of the flow passage.

10. A refractory unit as defined in claim 1, wherein a ratio (H/L) of a height (H) of the strips to a width (L) of the strips ranges between ⅛ and ½.

11. A refractory unit as defined in claim 10, wherein the refractory unit has a corner portion formed with a series of concave and convex strips which are adapted to engage with corresponding convex and concave strips of an adjacent refractory unit.

12. A refractory unit as defined in claim 1, wherein the strips of the inner wall differ from the strips of the outer wall.

13. A refractory unit for a heat regenerator comprising a unit body having a first end surface, a second end surface, an outer wall, an inner wall, and a flow passage formed by the inner wall and extending between the first and second end surfaces, the flow passage having a center line, the outer wall including a series of concave and convex strips, the inner wall including a series of concave and convex strips;

wherein the refractory unit has a specific surface which is increased by 40% or more as compared with a conventional refractory unit having only a flat wall for defining a flow passage; and wherein the convex and concave strips of the outer and inner walls include a series of crests and roots which are formed in the shape of bellows, and each top line of the crests is in parallel to the first and second end surfaces; and wherein the refractory unit has a corner portion formed with a series of concave and convex strips which are adapted to engage with corresponding convex and concave strips of an adjacent refractory unit.

14. A refractory unit for a heat regenerator comprising a unit body having a first end surface, a second end surface, an outer wall, an inner wall, and a flow passage formed by the inner wall and extending between the first and second end surfaces, the flow passage having a center line, the outer wall including a series of concave and convex strips, the inner wall including a series of concave and convex strips, wherein the convex and concave strips of the outer and inner walls include a series of crests and roots which are formed in the shape of bellows, and each top line of the crests is in parallel to the first and second end surfaces; and wherein the refractory unit has a corner portion formed with a series of concave and convex strips which are adapted to engage with corresponding convex and concave strips of an adjacent refractory unit and a ratio (H/L) of a height (H) of the strips to a width (L) of the strips ranging between $\frac{1}{8}$ and $\frac{1}{2}$.

15. A refractory unit for a heat regenerator comprising a unit body having a first end surface, a second end surface, an outer wall, an inner wall, and a flow passage formed by the inner wall and extending between the first and second end surfaces, the flow passage having a center line, wherein the refractory unit has four corners which are adapted to engage with corresponding corners of adjacent refractory units thereby to form a further flow passage defined by the outer walls of the refractory units, each of the corners having a series of concave and convex strips; and wherein all of the refractory units are substantially the same in shape, and engage with one another in a fitting condition by alternately turning the refractory units upside down.

* * * * *